(Model.)
B. G. MILLER.
Grain Cutting Machine.
No. 239,528. Patented March 29, 1881.
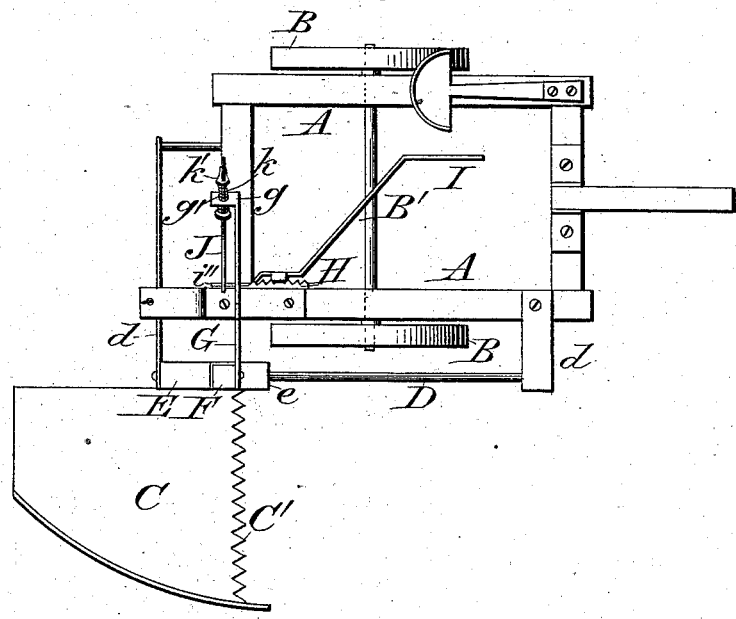
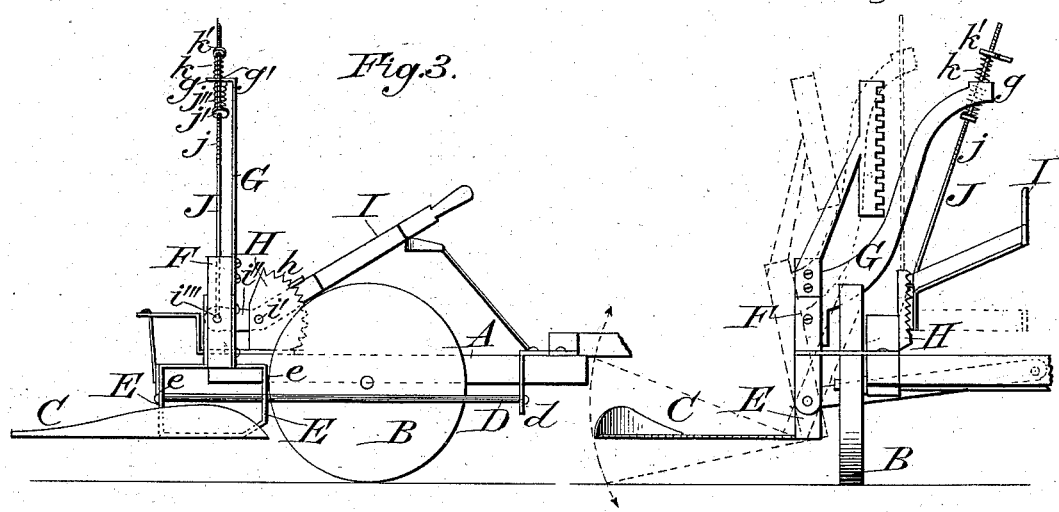
Attest:
F. H. Schott
H. A. Daniels
Inventor:
Benjamin G. Miller
By Newton Crawford atty.

UNITED STATES PATENT OFFICE.

BENJAMIN G. MILLER, OF STREATOR, ILLINOIS.

GRAIN-CUTTING MACHINE.

SPECIFICATION forming part of Letters Patent No. 239,528, dated March 29, 1881.

Application filed January 7, 1881. (Model.)

*To all whom it may concern:*

Be it known that I, BENJAMIN G. MILLER, a citizen of the United States, residing at Streator, in the county of La Salle and State of Illinois, have invented certain new and useful Improvements in Grain-Cutting Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to provide a means for raising and lowering the outer end of the cutter-bar and platform of the machine, and also providing suitable flexible connections therewith, whereby I avoid all the jar and concussion usually attendant upon the cutter-bar and cutters where wheels are used to support the outer part of the grain-platform, and thus do away with the necessity of supporting-wheels, and at the same time adjust the cutters to act parallel, or nearly so, with the surface of the ground, whether the ground be inclined toward or from the machine; and it consists in the construction of the parts, as will be fully hereinafter described.

In the drawings, Figure 1 represents a top view of the device. Fig. 2 represents a front view, and Fig. 3 represents a side view.

A represents the main frame of the machine.

B B represent the carrying-wheels; B', the axle.

C is the grain-platform, having the usual cutter-bar and cutter at its forward broad edge, C'.

D is a rock-shaft, arranged parallel with the side of frame A and outside of wheel B, and is supported at each of its ends by brackets $d$ $d$, that are secured on or attached to frame A, and in which it has its bearings.

E is a yoke or frame secured to the inner side of the grain-platform C, having upright fore-and-aft arms, $e$ $e$, and through which passes the longitudinal rock-shaft D, and on which shaft the yoke E will freely rock, or, if secured fast to the rock-shaft, will rock with it. These uprights $e$, at a proper distance above the rock-shaft, are turned at right angles, or nearly so, to connect with and be attached to the reel or rake post F, up which, on opposite sides, they extend a sufficient height to be securely attached thereto, and so that the reel or rake post will freely oscillate with the vibration of the yoke on the rock-shaft as the outer end of the cutter-bar is raised or lowered.

G is a bent brace or arm, firmly attached at its lower end to the reel or rake post, and rising in a curved oblique direction a proper height, when it assumes nearly a horizontal position to its upper and outer end, where there is a bent ear or lug, $g$, having a hole, $g'$, centrally through it to receive a screw-rod.

H is a segmental indent or toothed part of a circle rising perpendicularly up from and firmly attached to frame A, and has indents or teeth $h$ in its periphery.

I is a bent hand-lever, pivoted at the eye $i'$, or center of the circle forming the segmental indent H, so as to freely vibrate on its pivotal point, and has detents $i$ thereon at the proper place to engage with the teeth or indents $h$, and thus be held securely in any desired position, and at the same time, by moving the hand-lever up or down, the outer end of the cutter-bar will be raised or lowered. This lever I has an extension or arm, $i''$, projecting beyond the pivotal point $i'$, in which arm is a hole, $i'''$, to receive the hook or swivel end of a screw-rod.

J is a screw-rod, having a hook or swivel at its lower end, to be secured in hole $i'''$ in the arm $i''$ of lever I, and at its upper end it has a screw-thread, $j$, cut thereon for a considerable distance.

$j'$ is a screw-nut turned down on the rod J.

$j''$ is a spiral spring around screw-rod J, and, when the screw-rod is in place, hooked or swiveled into arm $i''$ at its lower end, and the upper end passing through hole $g'$ in ear $g$ of arm G, the spring will bear against the nut $j'$ at its lower end, and its upper end against the ear $g$ on arm G. $k$ is another spiral spring around screw-rod J, and $k'$ is an adjusting screw-nut, bearing on the upper end of spring $k$, while the lower end of spring bears upon the upper side of ear $g$ of arm G.

By such construction and arrangement of parts as above described the outer end of the cutter-bar and grain-platform can be supported and adjusted to agree with any inclination of the surface of the ground, or any uneven or rough places into or over which the wheels pass, without disturbing the relative position of the reel or rake with the grain-platform, and at the same time have a yielding connection furnished and applied in such manner that the concussion caused by the wheels striking an obstacle or rolling into a hollow or furrow is so little that it will save all the actuating machinery from damage or derangement by such concussion, and at the same time the degree of elasticity and tension is regulated and adjusted by the double action of the springs and nuts on the screw-rod above and below the ear on the supporting-arm on the reel or rake post.

Having thus described my invention, what I claim is—

1. In a grain-cutting machine, the combination of the hand-lever I, segmental indent H, screw-rod J, arm G, post F, platform C, and rock-shaft D, constructed to operate in the manner and for the purpose described.

2. The screw connecting-rod J, having the adjusting screw-nut $j'$, spring $j''$, and the spring $k$ and its adjusting screw-nut $k'$, constructed to operate as and for the purpose described.

In testimony whereof I affix my signature in presence of two witnesses.

BENJAMIN G. MILLER.

Witnesses:
JOHN T. KUHNS,
JAS. G. WILSON.